United States Patent
Lin

(10) Patent No.: US 9,506,663 B2
(45) Date of Patent: Nov. 29, 2016

(54) LIGHT-EMITTING HEAT-DISSIPATING DEVICE

(71) Applicant: THERMALTAKE TECHNOLOGY CO., LTD., Taipei (TW)

(72) Inventor: Pei-Hsi Lin, New Taipei (TW)

(73) Assignee: THERMALTAKE TECHNOLOGY CO., LTD. (TW)

(*) Notice: Subject to any disclaimer, the term of this patent is extended or adjusted under 35 U.S.C. 154(b) by 0 days.

(21) Appl. No.: 14/702,806

(22) Filed: May 4, 2015

(65) Prior Publication Data
US 2016/0154164 A1 Jun. 2, 2016

(30) Foreign Application Priority Data
Nov. 27, 2014 (TW) .............................. 103221009 U

(51) Int. Cl.
F24F 5/00 (2006.01)
F21V 33/00 (2006.01)
F21V 8/00 (2006.01)
F21Y 101/00 (2016.01)

(52) U.S. Cl.
CPC ......... F24F 5/0007 (2013.01); F21V 33/0096 (2013.01); G02B 6/0095 (2013.01); F21Y 2101/00 (2013.01)

(58) Field of Classification Search
CPC .............. G02B 6/0011; F21V 33/0096; F24F 5/0007; F21Y 2101/102

USPC .......................................................... 362/96
See application file for complete search history.

(56) References Cited

U.S. PATENT DOCUMENTS

| 7,261,431 | B2* | 8/2007 | Huang ................ | F04D 25/0613 362/656 |
| 8,987,756 | B2* | 3/2015 | Kim .......................... | F21S 9/03 257/82 |
| 2006/0012973 | A1* | 1/2006 | Lin ..................... | F04D 25/0613 362/96 |
| 2007/0025080 | A1* | 2/2007 | Li ........................... | F04D 29/30 361/695 |
| 2007/0237636 | A1* | 10/2007 | Hsu ..................... | F04D 25/0613 416/5 |
| 2009/0168400 | A1* | 7/2009 | Liu ..................... | F21V 33/0096 362/96 |

* cited by examiner

Primary Examiner — Laura Tso
(74) Attorney, Agent, or Firm — Schmeiser, Olsen & Watts, LLP

(57) ABSTRACT

A light-emitting heat-dissipating device includes a base, a light-emitting annular set, a fan and a cover. The base has an annular frame and a pivotal connection portion. The light-emitting annular set is annularly disposed at the annular frame of the base. The fan is pivotally disposed at a pivotal connection portion of the base. The cover is disposed on the annular frame of the base. The light-emitting annular set is annularly disposed between the cover and the base such that the light-emitting annular ring is not subjected to any external force or weight and thereby not predisposed to damage. The light-emitting annular set enables a halo with uniformly-distributed brightness to be formed above the light-emitting heat-dissipating device.

9 Claims, 3 Drawing Sheets

LIGHT-EMITTING HEAT-DISSIPATING DEVICE

CROSS-REFERENCE TO RELATED APPLICATION

This non-provisional application claims priority under 35 U.S.C. §119(a) on Patent Application No(s).103221009 filed in Taiwan, R.O.C. on Nov. 27, 2014, the entire contents of which are hereby incorporated by reference.

FIELD OF TECHNOLOGY

The present invention relates to fans, and more particularly, to a light-emitting heat-dissipating device with a light-emitting annular set.

BACKGROUND

Due to ever-changing technology, electronic products nowadays are indispensable to human beings' daily life. Heat is always generated from electronic products in operation and thus dissipated with a heat-dissipating device. For esthetic and visual sake, a light-emitting element is mounted on the heat-dissipating device.

However, to provide a visual effect, such as a halo, on the heat-dissipating device, the prior art discloses arranging a plurality of light-emitting elements annularly on the heat-dissipating device. To this end, a specific number of light-emitting elements are required. The more bulky the heat-dissipating device, the more light-emitting elements are required, thereby adding to the manufacturing costs of the heat-dissipating device. In addition, if a small number of light-emitting elements operate in conjunction with an annular light guiding frame, the annular light guiding frame covers the light-emitting elements directly, and in consequence the brightness of the halo is unevenly distributed due to low efficiency of the light guiding process.

Accordingly, it is imperative to provide a light-emitting heat-dissipating device for overcoming the aforesaid drawbacks of the prior art.

SUMMARY

It is an objective of the present invention to provide a light-emitting heat-dissipating device with a simple structure conducive to the formation of a halo.

Another objective of the present invention is to provide a light-emitting heat-dissipating device for forming a halo with uniformly distributed brightness.

In order to achieve the above and other objectives, the present invention provides a light-emitting heat-dissipating device which comprises a base, a light-emitting annular set, a fan and a cover. The base has an annular frame and a pivotal connection portion. The light-emitting annular set is annularly disposed at the annular frame of the base. The fan is pivotally disposed at a pivotal connection portion of the base. The cover is disposed on the annular frame of the base. The light-emitting annular set is disposed between the cover and the base.

In an embodiment of the present invention, the light-emitting annular set comprises a light guiding portion and at least a light-emitting unit. The light guiding portion is slender. The at least a light-emitting unit is disposed on the light guiding portion.

In an embodiment of the present invention, the light guiding portion comprises at least a light-emitting unit receiving chamber.

In an embodiment of the present invention, the light-emitting units are light-emitting diodes.

In an embodiment of the present invention, the light-emitting heat-dissipating device further comprises a side-opening hole disposed between the cover and the annular frame of the base.

Accordingly, the light-emitting heat-dissipating device of the present invention is characterized in that: the light-emitting annular set is configured in a manner to allow the light guiding portion and the light-emitting units to operate in conjunction with each other and thereby form a hole above the light-emitting heat-dissipating device; the light-emitting heat-dissipating device is structurally simple to thereby minimize its manufacturing cost; the light-emitting units are directly disposed on the light guiding portion to enhance light guiding efficiency and enable the brightness of the halo to be uniformly distributed; and, given the enhanced light guiding efficiency, the brightness of the halo is uniformly distributed even with just a few light-emitting elements. In addition, the light-emitting annular set is annularly disposed between the cover and the base such that the light-emitting annular ring is not subjected to any external force or weight and thereby not predisposed to damage.

BRIEF DESCRIPTION

Objectives, features, and advantages of the present invention are hereunder illustrated with specific embodiments in conjunction with the accompanying drawings, in which.

DETAILED DESCRIPTION

Figure 1:
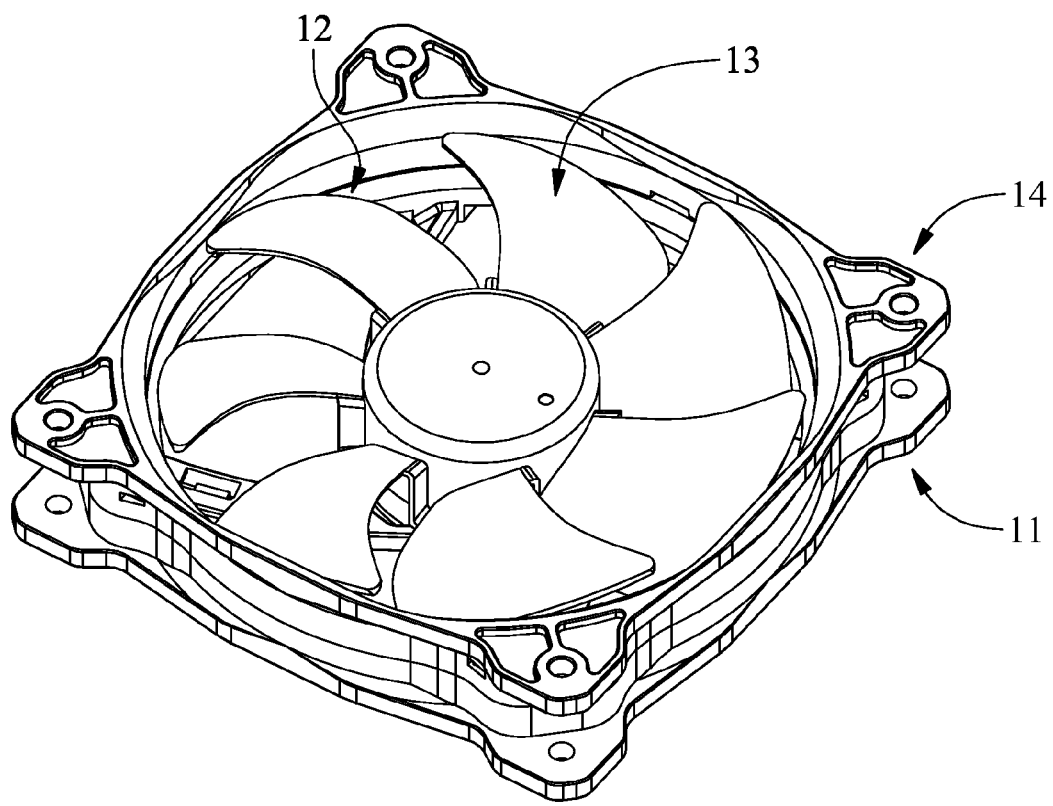
FIG. 1 is a perspective view of a light-emitting heat-dissipating device according to the first embodiment of the present invention.
Figure 2:
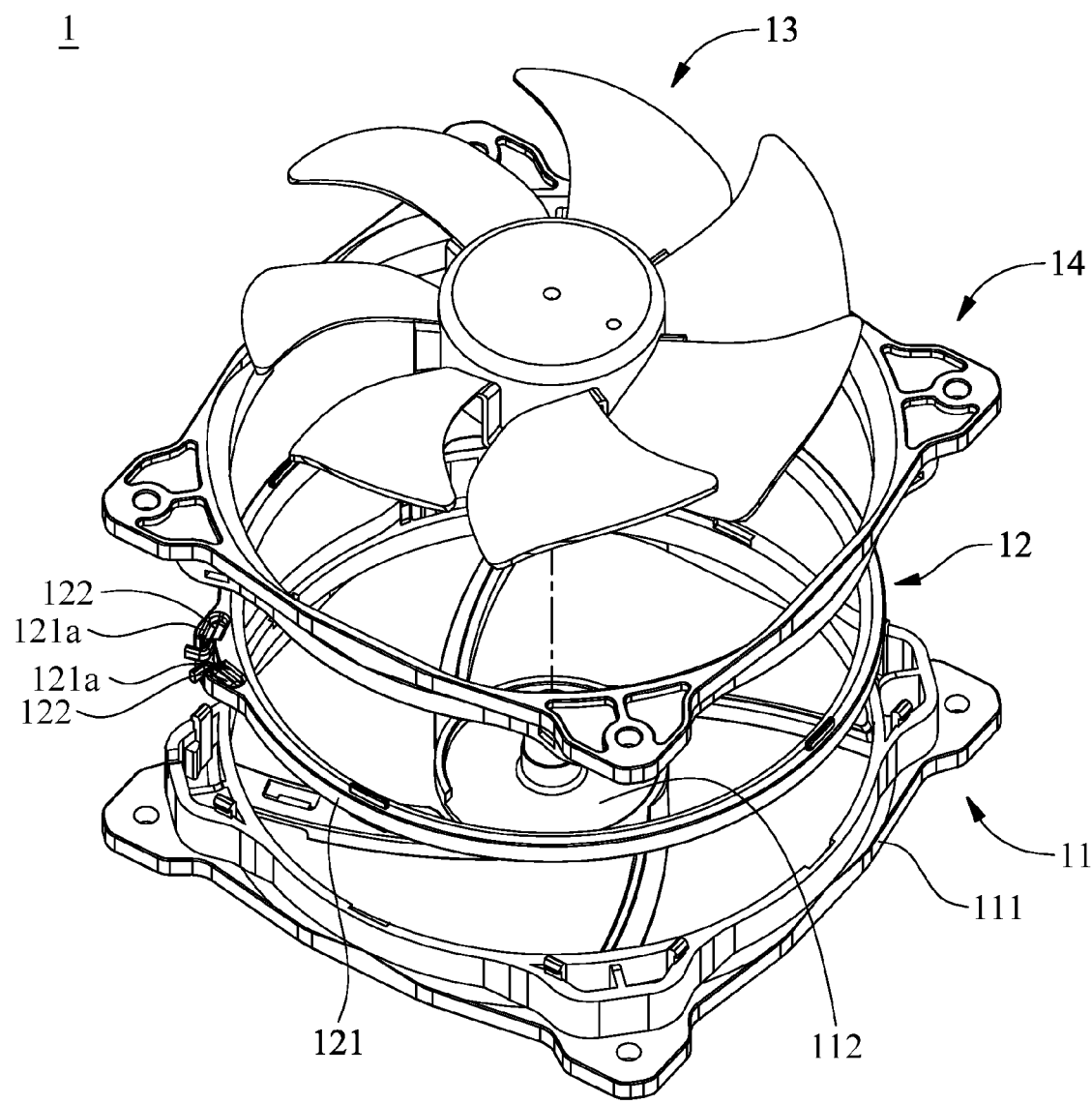
FIG. 2 is an exploded view of the light-emitting heat-dissipating device according to the first embodiment of the present invention.

Referring to FIG. 1 and FIG. 2, the first embodiment of the present invention provides a light-emitting heat-dissipating device 1. The light-emitting heat-dissipating device 1 comprises a base 11, a light-emitting annular set 12, a fan 13 and a cover 14.

The base 11 has an annular frame 111 and a pivotal connection portion 112. In this embodiment, the pivotal connection portion 112 is centrally disposed at the annular frame 111. The light-emitting annular set 12 is annularly disposed on the annular frame 111 of the base 11. The light-emitting annular set 12 comprises a light guiding portion 121 and two light-emitting units 122. The light guiding portion 121 is not only slender but is also annularly disposed on the annular frame 111. The light-emitting units 122 is disposed on the light guiding portion 121. The light-emitting units 122 are provided in the form of light-emitting diodes (LED). In this embodiment, the light guiding portion 121 has two light-emitting unit receiving chambers 121a, and the light-emitting unit receiving chambers 121a receive the light-emitting units 122. The fan 13 is pivotally disposed on the pivotal connection portion 112 of the base 11 to start to rotate as soon as the light-emitting heat-dissipating device 1 starts. The cover 14 is disposed on the annular frame 111 of the base 11 such that the light-emitting annular set 12 is disposed between the cover 14 and the base 11.

The light-emitting heat-dissipating device 1 is disposed on a heat dissipation-required element (not shown) to meet user needs. The fan 13 starts to rotate as soon as the light-emitting heat-dissipating device 1 starts, so as to dissipate heat generated from the heat dissipation-required element. The light-emitting units 122 emit light as soon as the light-emitting annular set 12 starts, and in consequence the light emitted from the light-emitting units 122 enters the light guiding portion 121 and gets reflected repeatedly inside the light guiding portion 121, so as for the light-emitting annular set 12 to form a halo while the light guiding portion 121 is emitting light. In this embodiment, the light guiding portion 121, which is slender and solid, is filled with a light guiding material whereby the light emitted from the light guiding portion 121 is guided through its light path in a manner to form the halo. In this embodiment, the light-emitting units 122 are in the number of two and are disposed on the same side of the light guiding portion 121. However, the quantity and positions of the light-emitting units 122 disposed at the light guiding portion 121 are subject to changes as needed.

Therefore, the light-emitting heat-dissipating device of the first embodiment of the present invention comprises the light-emitting annular set, the light guiding portion and the light-emitting units which operate in conjunction with each other to form the halo on the light-emitting heat-dissipating device, enable the light-emitting heat-dissipating device to be visually attractive, simplify the structure of the light-emitting annular set, cut the manufacturing costs of the light-emitting heat-dissipating device, enhance the light guiding efficiency by disposing the light-emitting units directly on the light guiding portion, and ensure the uniform distribution of the brightness of the halo thus formed. Furthermore, given the enhanced light guiding efficiency, the halo is sufficiently and evenly bright even though just a few light-emitting elements are available. In addition, the light-emitting annular set is annularly disposed between the cover and the base such that the light-emitting annular ring is not subjected to any external force or weight and thereby not predisposed to damage.

Figure 3:
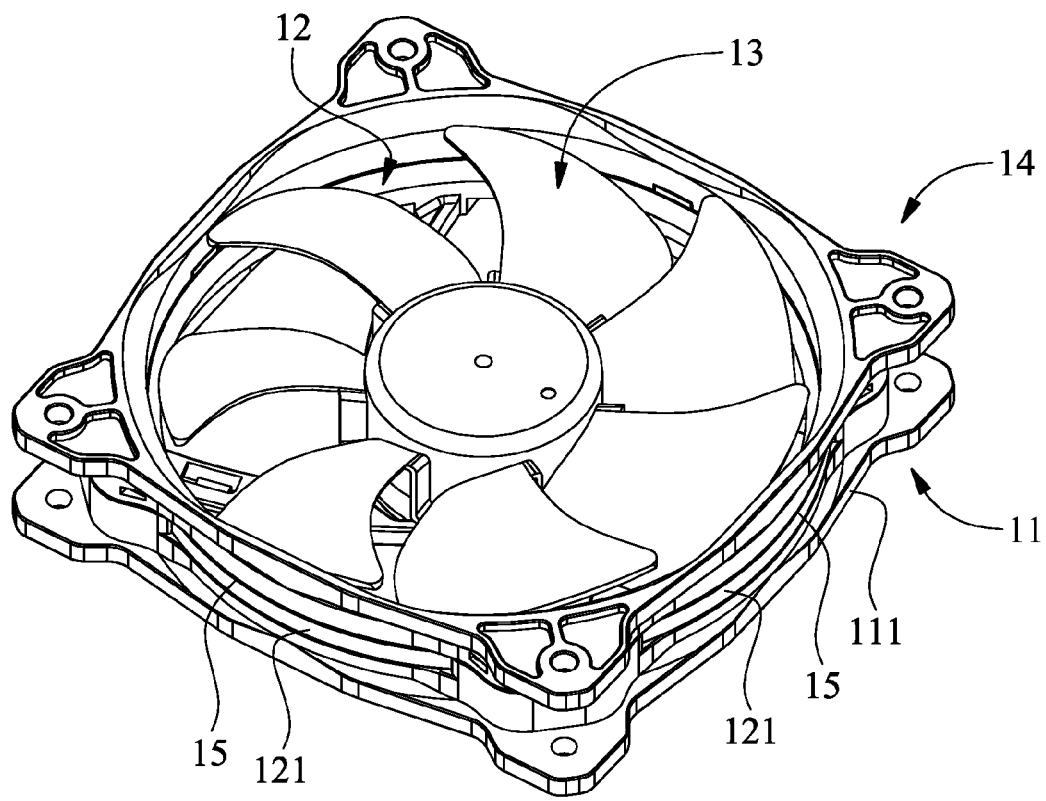
FIG. 3 is a perspective view of a light-emitting heat-dissipating device according to the second embodiment of the present invention.
Figure 4:
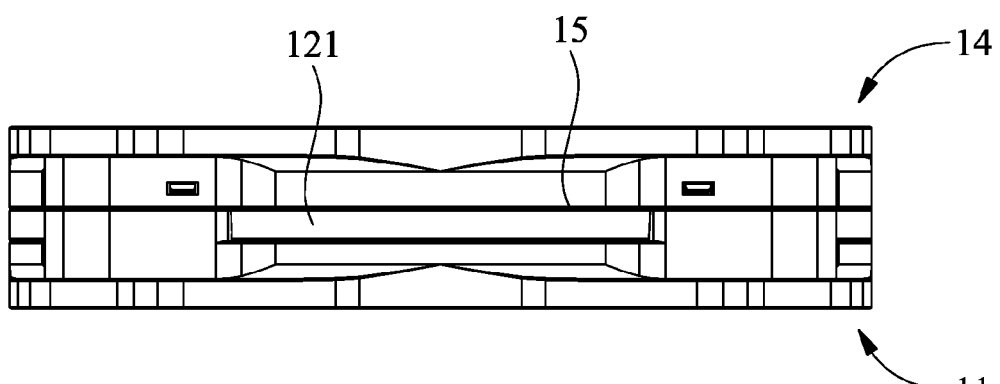
FIG. 4 is a lateral view of the light-emitting heat-dissipating device according to the second embodiment of the present invention.

Referring to FIG. 3 and FIG. 4, the second embodiment of the present invention provides a light-emitting heat-dissipating device 1'. Unlike the light-emitting heat-dissipating device 1, the light-emitting heat-dissipating device 1' comprises side-opening holes 15.

The side-opening holes 15 are disposed between the cover 14 and the annular frame 111 of the base 11 such that the light guiding portion 121 is partially exposed from the external surface of the light-emitting heat-dissipating device 1'. Hence, the light-emitting heat-dissipating device 1' not only enables the light-emitting heat-dissipating device 1 to function well but also enables the external surface of the light-emitting heat-dissipating device 1' to emit light and thus become visually attractive as soon as the light-emitting heat-dissipating device 1' starts and drives the light-emitting annular set 12 to emit light. In this embodiment, although the side-opening holes 15 are disposed on all the four external surfaces of the light-emitting heat-dissipating device 1', the quantity and positions of the side-opening holes 15 are subject to changes as needed.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A light-emitting heat-dissipating device, comprising:
a base having an annular frame and a pivotal connection portion;
a light-emitting annular set annularly disposed at the annular frame of the base;
a fan pivotally disposed at the pivotal connection portion of the base; and
a cover disposed on the annular frame of the base, wherein the light-emitting annular set is disposed between the cover and the base;
wherein the light-emitting annular set comprises a light guiding portion which is slender, annular and annularly disposed on the annular frame, and at least a light-emitting unit disposed on the light guiding portion.

2. The light-emitting heat-dissipating device of claim 1, wherein the light-emitting units are light-emitting diodes.

3. The light-emitting heat-dissipating device of claim 1, wherein the light guiding portion comprises at least a light-emitting unit receiving chamber.

4. The light-emitting heat-dissipating device of claim 3, wherein the light-emitting units are light-emitting diodes.

5. The light-emitting heat-dissipating device of claim 1, further comprising aside-opening hole disposed between the cover and the annular frame of the base.

6. The light-emitting heat-dissipating device of claim 1, further comprising aside-opening hole disposed between the cover and the annular frame of the base.

7. The light-emitting heat-dissipating device of claim 2, further comprising aside-opening hole disposed between the cover and the annular frame of the base.

8. The light-emitting heat-dissipating device of claim 3, further comprising aside-opening hole disposed between the cover and the annular frame of the base.

9. The light-emitting heat-dissipating device of claim 4, further comprising aside-opening hole disposed between the cover and the annular frame of the base.

* * * * *